United States Patent [19]
Hahn

[11] 4,056,949
[45] Nov. 8, 1977

[54] APPARATUS FOR COOLING TOOLS OF GLASS-FORMING MACHINES BY EVAPORATION OF A COOLING LIQUID

[75] Inventor: Karl Friedrich Hahn, Obernkirchen, Germany

[73] Assignee: Hermann Heye, Obernkirchen, Germany

[21] Appl. No.: 675,806

[22] Filed: Apr. 12, 1976

Related U.S. Application Data

[63] Continuation of Ser. No. 461,385, April 6, 1974, abandoned.

[30] Foreign Application Priority Data

May 2, 1973 Germany .............................. 2322091

[51] Int. Cl.² ............................................. F25D 17/02
[52] U.S. Cl. ......................................... 62/373; 62/64; 65/355; 164/128; 164/348
[58] Field of Search ................... 62/64, 74, 373, 374, 62/375, 376; 65/355, 356; 164/126, 128, 348

[56] References Cited

U.S. PATENT DOCUMENTS

| | | | |
|---|---|---|---|
| 2,339,840 | 1/1944 | Daly et al. | 164/348 |
| 2,772,540 | 12/1956 | Vierkotter | 62/64 |
| 2,988,851 | 6/1961 | Holscher | 65/356 |
| 3,001,377 | 9/1961 | DiQuattro | 62/64 |
| 3,468,362 | 9/1969 | Burkhardt et al. | 62/374 |
| 3,654,989 | 4/1972 | Meier | 164/348 |
| 3,838,997 | 10/1974 | Becker et al. | 62/64 |

Primary Examiner—Ronald C. Capossela
Attorney, Agent, or Firm—Michael J. Striker

[57] ABSTRACT

An apparatus for cooling tools of glass-forming machines, especially plungers and molds, in which the tool surface to be cooled is substantially covered by cover means in contact with the tool surface and in which a cooling liquid is applied to the cover means so that the liquid will evaporate and cool the cover means, as well as the tool surface in contact therewith.

18 Claims, 9 Drawing Figures

APPARATUS FOR COOLING TOOLS OF GLASS-FORMING MACHINES BY EVAPORATION OF A COOLING LIQUID

This is a continuation of application Ser. No. 461,385, filed Apr. 6, 1974, now abandoned.

BACKGROUND OF THE INVENTION

The present invention relates to a method and an apparatus for evaporative cooling of tools of glass-forming machines, for instance plungers and molds, with a cooling liquid.

Known method and apparatus of this type are described in an article "Methoden der Formenkuhlung an Glasverarbeitungsmaschinen" ("Methods for Cooling of Molds in Glass-forming Machines") by Rudolf Wille, published in the magazin No. 7 "Konstruktion und Betrieb von Glasverarbeitungsmaschinen" ("Construction and Operation of Glass-forming Machines"), published by the Deutsche Glastechnische Gesellschaft (German Society for Glass Technique), Frankfurt am Main, 1961, pages 35 – 43. There a plurality of nipples, into which cooling water is fed in the form of drops, are screwed locally into the outer wall of the mold. This known way of cooling a mold has many disadvantages. The heat sinks, i.e., the nipples, are stationarily arranged with regard to the mold surface. The diameter of each of the nipples is necessarily small and a mold provided with a plurality of such nipples is relatively expensive. Such molds have to have a relatively great wall thickness in order to permit a threading connection of the nipples and in order to obtain, in view of the small size of the heat sinks, by means of increased wall thickness a sufficient temperature distribution over the entire mold surface. While it is possible to provide a relatively great number of nipples per surface unit, such an arrangement will evidently be rather expensive. The known mold has relatively large dimensions, due to the necessary great wall thickness, the nipples threadingly connected thereto, and the necessary feed conduits for feeding cooling fluid to the nipples, which is especially detrimental when for the mounting of the mold, especially in molds for small hollow glass bottles, only limited surface areas are available. This particularly holds for conditions where double gob molds are operated.*) An additional disadvantage of this known arrangement is that water will collect at the bottom of the nipples so that evaporation of the liquid will occur beneath the liquid level and therefore under difficult conditions.

*) Caused by the design of the production machines, double gob molds are arranged so close together that no nipples can be located in an area which needs cooling most.

At sufficiently large overheating of the liquid the danger of film evaporation with a greatly reduced heat-transfer coefficient exists (see the above referred Wille article, page 39, picture 8). There exists further the difficulty to optimize the spatial arrangement of the heat sinks, since the heat sinks cannot be in any desired manner distributed over the surface of the mold. A cooling of the mold bottom in a divided mold is not provided. In addition, there is no possibility to influence at these known heat sinks the amount of the heat transfer.

According to another known method and apparatus (Austrian Pat. No. 24,927) an adjustable amount of cooling liquid is dripped or squirted into the hollow wall of the mold. The thus formed water vapor passes through the cavity formed in the mold wall to cool the latter. This method has the disadvantage that the water fed into the mold, will impinge only onto a relatively small area of the mold surface. A further disadvantage is the fact that the temperature of the mold surface is so high that a vapor cushion develops beneath the infed water. As already explained hereinabove in connection with the Wille article, this cushion develops because the high temperature difference between mold surface and water prevents the desirable so-called bubble type evaporation. What actually occurs is the so-called film evaporation, i.e., the formation of a continuous vapor film between mold surface and water (the Leidenfrost phenomenon), which yields a much lower heat transfer coefficient than with bubble evaporation. The described cushion of the vapor film prevents the desirable and necessarily high heat extraction from the mold. A cooling of the remainder of the mold wall by convecting heat transfer by means of water vapor is, due to the small amount of available vapor volume, not obtainable and therefore an essential improvement of the cooling of the remainder of the mold wall cannot be expected. A substantially uniform temperature of the mold surface facing the glass is not obtainable with this known cooling method, neither is it possible to obtain sometimes desired temperature profiles on the surface to be cooled. In addition the mold wall has to be hollow and relatively thick, and requires therefore a relatively large space, which, especially in modern compact automatic glass forming machines, is not available.

It is further known from the German Auslegeschrift 2,150,193 to spray a cooling liquid directly onto the tool surface to be cooled, which may be profiled.

SUMMARY OF THE INVENTION

An object of the invention is to improve the cooling of the tools of glass-forming machines and to avoid especially film evaporation of the cooling liquid during normal operation of the tools.

With these and other objects in view, which will become apparent as the description proceeds, the apparatus of the present invention for cooling tools of glass-forming machines, especially plungers and molds, mainly comprises cover means in contact with and substantially covering the surface of the tool which is to be cooled, and means for applying a cooling liquid to that surface of the cover means which is opposite the surface thereof contacting the tool surface to be cooled, so that the liquid will evaporate upon contact with the opposite surface of the cover means.

Preferably, according to the method of the present invention, the difference between the temperature of the surface of the cover means which is contacted by the cooling liquid, on the one hand, and the boiling point of the cooling liquid, on the other hand (overheating), is held during the normal operation of the tool, in the region of a critical temperature difference, at the border between bubble evaporation and film evaporation, and preferably in the region of bubble evaporation.

The use of compressed air as cooling medium and the resulting extreme noise can thus be avoided so that the invention contributes to a more human atmosphere of the working environment.

The surface of the tool to be cooled can thereby have a more or less great natural roughness, or it may purposely be profiled, for instance provided with cooling fins. This means that even existing mold equipment can be provided with cover means according to the invention. The roughness or profiling may additionally, or only, be provided on the surface of the cover means which contacts the tool surface to be cooled. It is only necessary that between the tool and the cover means a sufficiently large total area of contact for the heat conduction will be maintained, wich will prevent accumulation of heat in the tool wall, and which will assure to obtain a desired magnitude of overheating on the surface of the cover means which is contacted by the cooling liquid. When the cover means is releasably connected to the tool, the tool may be used in a conventional manner without cover means or in accordance with the present invention. The application of the cooling liquid onto the cover means may be carried out in any desired manner.

The cover means may comprise a metal plate in contact with the tool surface to be cooled, and this metal plate may be shaped in accordance with said tool surface and/or may be continuous or may be formed with perforations. Additionally, an intermediate layer may be sandwiched between the metal plate and the tool surface in contact with the latter and the plate. The advantage of said intermediate layer is that it allows to reduce the thickness of the metal plate without reducing the desired heat transfer. In addition the intermediate layer may be applied in order to affect the amount of the contacting surface areas of tool and metal plate. The intermediate layer may be formed from heat-resistant, non-metallic material, for instance be formed of glass or asbestos fibers. In such an arrangement the intermediate layer may have a small thickness while assuring a relatively great contact surface with sufficient heat transfer. On the other hand, the intermediate layer may consist of a wire mesh which will result in a relatively small contact surface between the tool surface to be cooled on the one hand and the metal plate on the other hand. The cover means may also include a layer applied to that surface of the cover means which is opposite the surface thereof in contact with the tool surface to be cooled, and the cooling liquid is then applied to this layer so that the latter will retain at least part of the cooling liquid and/or distribute the same preferably by capillary action. If this layer is not form-retaining by itself, then an additional holding layer, for instance a wire mesh, may be applied thereto. A distribution of the cooling liquid by the cover means is especially desirable when the colling liquid may be applied only to localized portions of the cover means. In such case, the distribution layer will assure distribution of the cooling liquid also to such portions of the cover means which cannot be directly reached by a spray of cooling liquid. In this way, it is possible to withdraw heat uniformly from the outer surface of the cover means by evaporation over a large surface area.

The attachment of the cover means may for instance be carried out by welding or by riveting and such attachment is then advisable when the cover means can remain permanently connected to the tool. On the other hand, the cover means may be releasably fastened to the tool, which will make it possible to cool the tool in the conventional manner or in accordance with the present invention. Such releasable fastening will also facilitate repair of the cover means and the tool. Advantageously, the cover means is attached to the tool surface in such a manner that it may slightly shift along the tool surface, which is especially necessary during intermittent application of cooling liquid to the cover means which results in a periodical heat expansion or contraction of the cover means relative to the tool surface. In this case, the cover means is preferably fixed at one point to the tool surface, so that the remainder of the cover means may shift from this fixed point in all directions relative to the tool surface. The attachment of the cover means to the tool surface is preferably carried out in such a manner that the cover means may be pressed with a variable force against the tool surface to be cooled so that the total area of contact between cover means and tool surface and correspondingly the magnitude of the heat transfer may be varied. Such an arrangement is especially advantageous when the cover means comprises a plurality of layers which may thus be pressed to a varying degree against each other and against the tool surface to be cooled. The cooling liquid preferably consists essentially of pretreated, for instance desalted, delimed and filtered water with a wetting agent, for instance a detergent, methanol or ethanol. The means for applying liquid to the cover means preferably comprises a plurality of spaced spray nozzles, and the apparatus may also include at least one temperature sensing means engaging the cover means for sensing the temperature of the latter, and means for controlling spraying of the cooling liquid through the spray nozzles onto the cover means dependent on the temperature sensed by the temperature sensing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
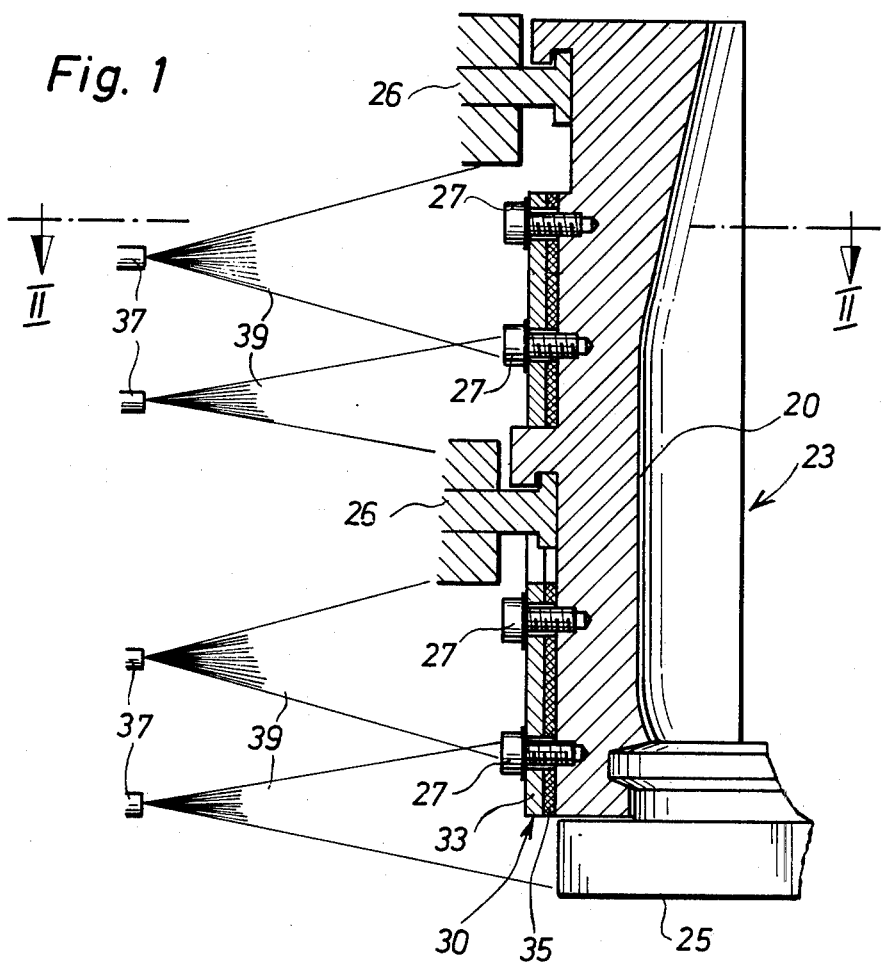
FIG. 1 is a longitudinal cross section of a blow mold half with cover means applied to the outer surface thereof.

FIG. 1 illustrates one half 20 of a blow mold 23 in closed condition in which the mold half shown engages the bottom 25 of the mold. The mold half 20 is suspended in a gripper 26, only partially shown in FIG. 1.

Cover means 30 are applied and held by screws 27 to the outer surface of the mold half 20 and these cover means comprise an intermediate layer 35 of non-metallic material, for instance glass or asbestos fibers and an outer metal plate 33.

The cooling liquid is sprayed in form of spray cones 39 from a plurality of spray nozzles 37 onto the outer surface of the metal plate 33 at which the cooling liquid evaporates.

Pretreated water with an additional wetting agent such as a detergent, methanol or ethanol is preferably used as cooling liquid.

Figure 2:
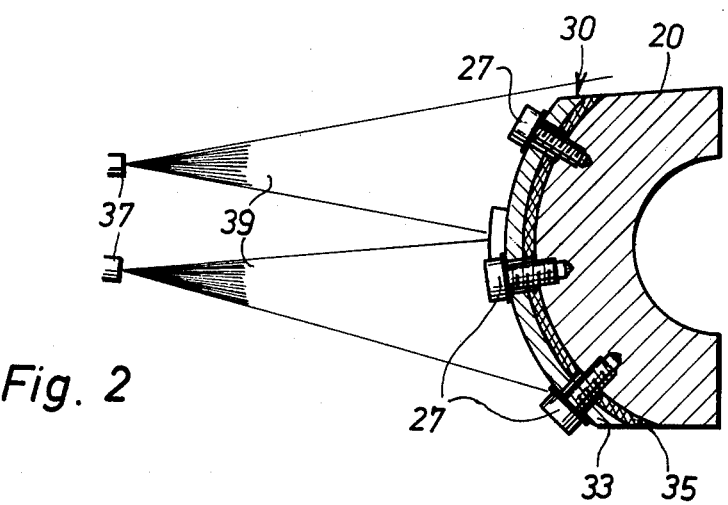
FIG. 2 is a cross section taken along the line II—II of FIG. 1.

As shown in FIG. 2, the intermediate layer 35 and the outer metal plate 33 are bent according to the outer contour of the mold half 20 and cover substantially the outer surface of the latter.

It is to be understood that the other mold half, not shown in FIGS. 1 and 2, is provided in a similar manner with cover means onto which the cooling liquid is sprayed.

Figure 3:
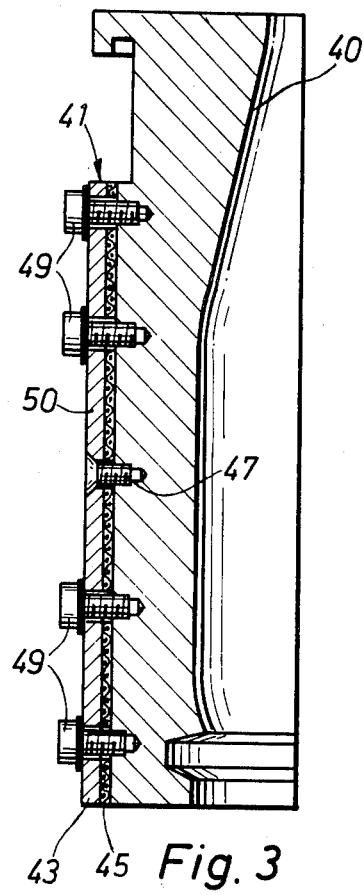
FIG. 3 is a longitudinal cross section similar to FIG. 1 and showing a different embodiment of the cover means.

FIG. 3 illustrates a blow mold half 40 which, in a manner similar as the above described blow mold half 20, is provided with cover means 41 which comprises a metal plate 43 and a wire mesh 45 sandwiched between the metal plate 43 and the outer surface of the mold half 40. The cover means 41, comprising the metal plate 43 and the wire mesh 45, is in a central region fastened to the mold half 40 by a centering screw 47. The cover means is further held onto the outer surface of the mold half 40 by a plurality of additional screws 49, which pass through the cover means 41 with sufficient clearance or play. These screws 49 serve to press the cover means 41 in a desired manner against the outer surface of the mold half 40, to influence in this way the magnitude of the contact surfaces between the wire mesh 45 and the outer surface of the mold half 40, on the one hand, and the wire mesh 45 and the metal plate 43, on the other hand. In this way, the magnitude of the heat conduction between the mold half 40 and the surface 50 of the cover means 41 which is contacted by the cooling liquid may be influenced. Due to the clearance around the screws 49, the cover means 41 may shift in all directions from the centering screw 47 relative to the outer surface of the mold half 40 and such movement is necessary at different heat expansion of the mold half 40 and the cover means 41.

Figure 4:
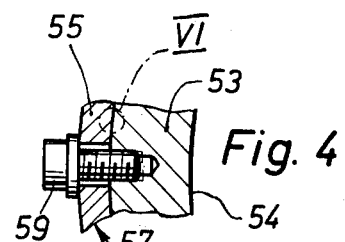
FIGS. 4 and 5 are partial transverse cross-sections of a mold with different cover means applied to the outer surfaces thereof.

FIG. 4 partially illustrates a mold 53, the inner surface 54 of which is periodically contacted with hot glass, and to the outer surface of which a cover means 57 comprising a metal plate 55 is applied. The metal plate 55 is pressed against the outer surface of the mold 53 by means of screws 59, only one of which is shown in FIG. 4.

Figure 5:
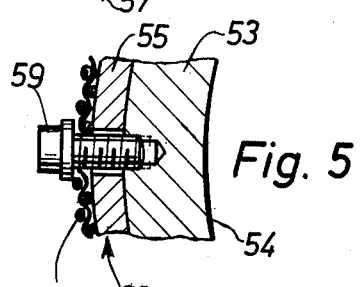

FIG. 5 illustrates a similar, but modified arrangement in which the cover means 60 comprises besides the metal plate 55, an outer layer 63 applied thereto. The outer layer 63 is constituted by a wire mesh which has the task to prevent immediate run-off of the cooling fluid applied thereagainst and/or to distribute the cooling fluid over the outer surface of the metal plate 55.

Figure 6:
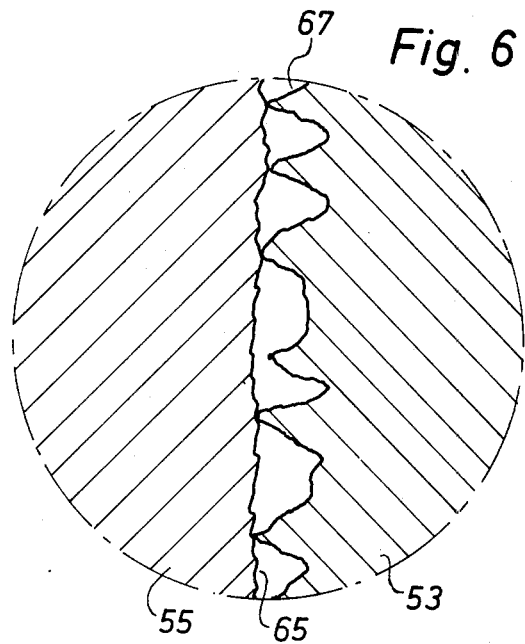
FIG. 6 is detail VI of FIG. 4, drawn to a considerably enlarged scale.

FIG. 6 illustrates a detail of FIG. 4 at a greatly enlarged scale, and as can be seen from FIG. 6 the inner surface 65 of the metal plate 55 is relatively smooth, whereas the outer surface 67 of the mold half 53 is very rough. The sum of all partial contacts between the mold 53 and the metal plate 55 in the region of the points of the rough surface 67 constitutes the total contact surface through which heat conduction from the mold 53 to the metal plate 55 takes place.

Figure 7:
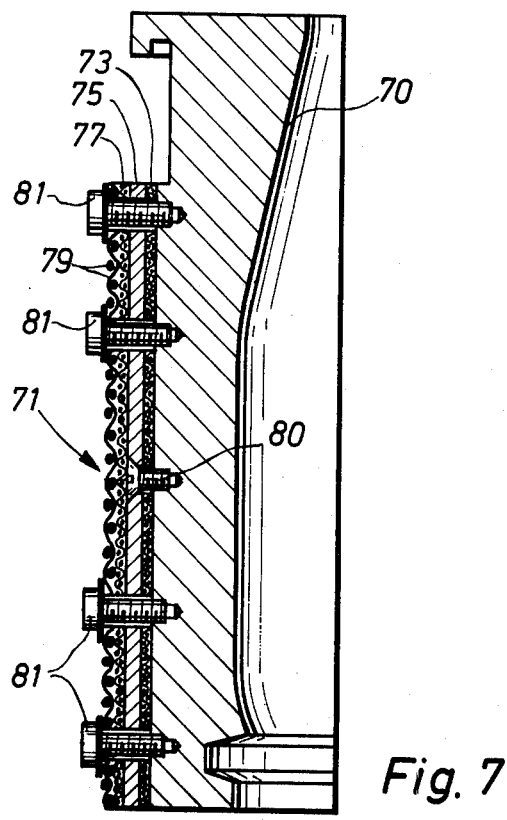
FIG. 7 is a longitudinal cross section of a further embodiment of cover means applied to the outer surface of a blow mold.

FIG. 7 illustrates a further modification in which a mold half 70 is provided on its outer surface with cover means 71. The cover means 71 comprises an intermediate layer 73 in form of a wire mesh, a metal plate 75, and an outer layer 77 which may consist of non-metallic material, such as for instance glass or asbestos fibers and a holding layer 79 in the form of a coarse wire mesh superimposed thereupon. The holding layer 79 has the task to prevent damage to the layer 77 which serves to hold and to properly distribute the cooling liquid, and to hold the layer 77 uniformly against the metal plate 75. The cover means 71 is again fixed on the mold half 70 by a centering screw 80, whereas other screws 81, passing with clearance through cover means 71, serve to press the cover means 71 with the desired pressure onto the mold half 70.

Figure 8:
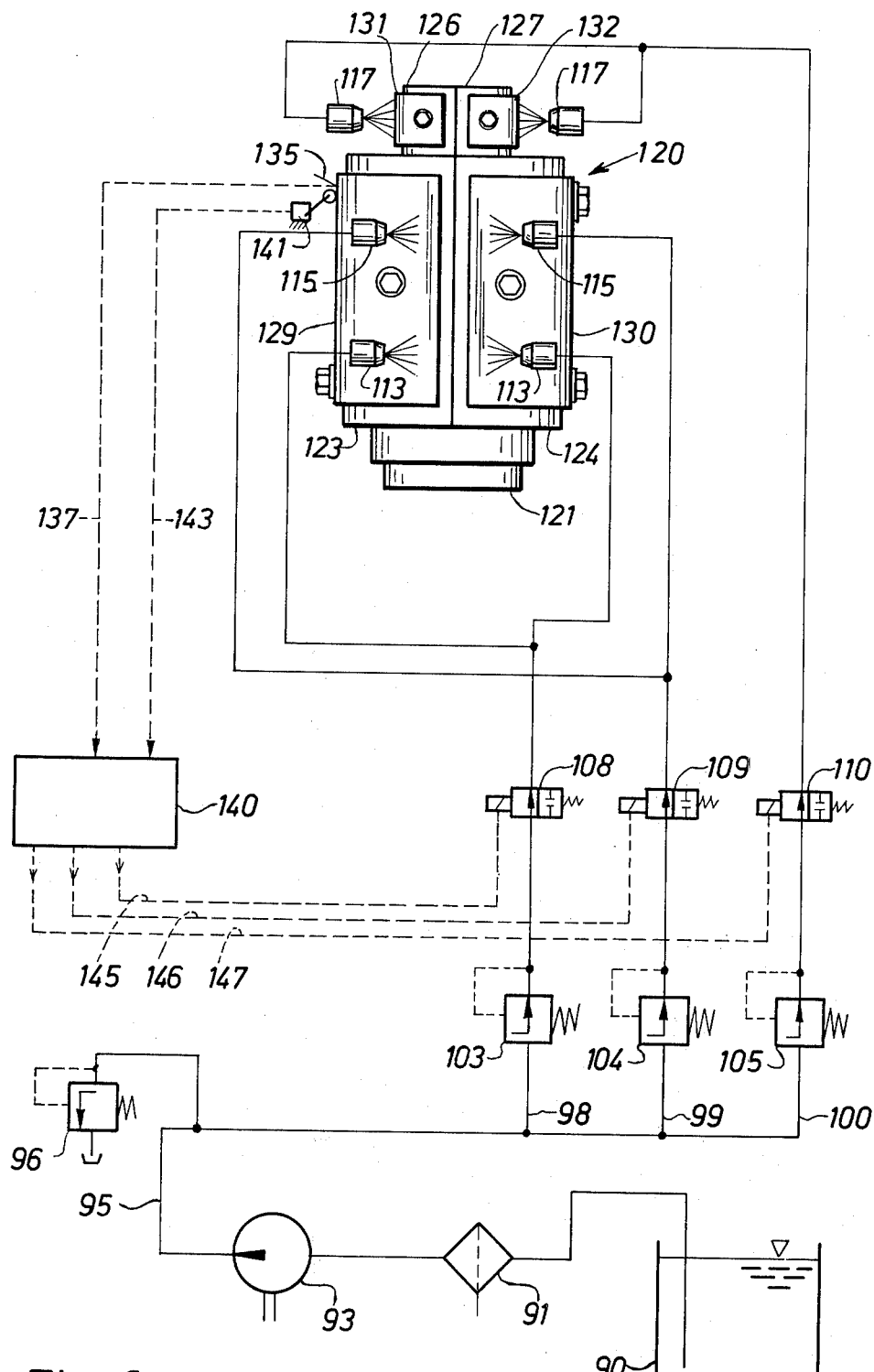
FIG. 8 is a circuit diagram illustrating the supply of cooling fluid to a plurality of spray nozzles arranged about a blow mold.

FIG. 8 schematically illustrates a circuit diagram for supplying a plurality of nozzles arranged about a blow mold 120 with cooling liquid. The cooling liquid, preferably pretreated water with a wetting agent, is taken from a tank 90 and pumped by a pump 93 through a filter 91 into a conduit 95 which is protected by a pressure limiting valve 96. The cooling liquid passes from the conduit 95 into three branch conduits 98, 99, and 100 in which pressure regulating valves 103, 104 and 105 are respectively arranged. In each of the branch conduits 98, 99 and 100 is further arranged a two-way-two-position valve 108, 109, 110, respectively.

The branch conduit 98 is connected to lower spray nozzles 113, only two of which are shown in the drawing, the branch conduit 99 is connected to intermediate spray nozzles 115 of which also only two are shown, and the branch conduit 100 is connected to the upper spray nozzles 117. The liquid sprayed through the nozzles serves to cool blow mold 120 which comprises a mold bottom 121, two blow mold halves 123 and 124 and two neckring halves 126 and 127. The blow mold halves 123 and 124 as well as the neckring halves 126 and 127 are respectively provided with cover means 129, 130, 131 and 132, onto which the spray nozzles 113, 115 and 117 spray the cooling liquid.

The arrangement comprises further a temperature sensing means 135, which may for instance be in contact with the outer surface of the cover means 129, and which is connected by a conductor 137 to an input of a controller 140. The arrangement preferably comprise also a position switch 141 which is connected by a conductor 143 to a further input of the controller 140. Three conductors 145, 146, 147 respectively connect outputs of the controller 140 with electromagnets of the electromagnetically operated valves 108, 109 and 110.

As soon as the mold halves 123 and 124 reach, during the operating cycle of the machine, a position in which spraying is to start, the position switch 141 produces a signal which is transmitted to the controller 140. The controller 140 thereupon controls over the conductors 145, 146 and 147 the valves 108, 109 and 110, and switches these valves to an open position, as shown in FIG. 8, in which the spray nozzles 113, 115 and 117 are supplied with cooling liquid and spray such cooling liquid onto the mold 120. The time of spraying through the individual nozzles is controlled by the temperature sensing means 135 which will cause switching of the valves 108, 109 and 110 to the closed position when the temperature sensing means 135 senses a temperature lower than a predetermined value, that is when the cooling of the mold 120 is sufficiently advanced. Evidently, it is also possible to provide a plurality of temperature sensing means at different locations of the mold 120 so that spraying of cooling fluid onto different portions of the mold 120 may be individually controlled.

Figure 9:
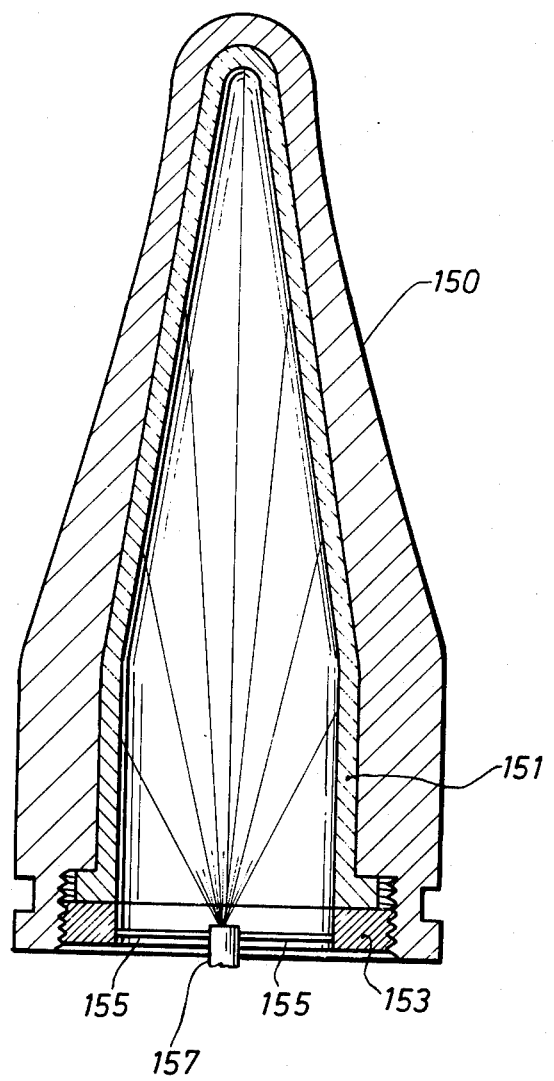
FIG. 9 is a longitudinal cross section through a press plunger with cover means applied to the inner surface of the hollow plunger.

Finally, FIG. 9 illustrates a press plunger 150 of a glass molding machine which is hollow and which is provided at its inner surface, that is the surface thereof which is opposite from the surface contacting during operation of the press plunger the molten glass, with a cover 151, which is held in the interior of the press plunger 150 in contact with the inner surface thereof by a threaded ring 153. The ring 153 carries by means of spokes 155 a spray nozzle 157 through which cooling liquid is sprayed onto the inner surface of the cover means 151. It is to be understood that the cover means 151 can be, in a manner similar as described before, constituted by a plurality of layers and be fastened to the inner surface of the press plunger by a plurality of screws or the like.

It will be understood that each of the elements described above, or two or more together, may also find a useful application in other types of apparatus for cooling tools, especially plungers and molds of glass forming machines differing from the types described above.

While the invention has been illustrated and described as embodied in an apparatus for cooling tools of glass forming machines in which the tool surface to be cooled is substantially covered by cover means held in contact with the tool surface and in which cooling liquid is sprayed against the cover means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. Apparatus for cooling tools of glass-forming machines by evaporation of a cooling liquid, comprising cover means substantially covering the tool surface to be cooled, said cover means having a surface in contact with said tool surface and being constructed and connected to said tool surface to vary the heat transfer between said surfaces to thus avoid film evaporation of a cooling liquid applied to that surface of said cover means which is opposite the surface in contact with said tool surface; and means for applying cooling liquid to said opposite surface of said cover means.

2. Apparatus as defined in claim 1, wherein at least one of said surfaces which are in contact with each other is a rough surface arranged to reduce the area of contact between said surfaces.

3. Apparatus as defined in claim 2, wherein said cover means comprises a metal plate having a surface in contact with said tool surface to be cooled.

4. Apparatus as defined in claim 3, wherein said cover means comprises a metal plate shaped in accordance with the tool surface to be cooled and in contact therewith.

5. Apparatus as defined in claim 4, and including a layer adapted to retain cooling liquid and distributes the same especially by capillary action, said layer being applied to that surface of said cover means which faces away from the tool surface to be cooled.

6. Apparatus as defined in claim 1, wherein said cover means comprises a metal plate facing said tool surface to be cooled, and an intermediate layer sandwiched between said metal plate and said surface in contact with the latter and said metal plate, said intermediate layer being constructed to limit heat transfer between said tool surface and said metal plate.

7. Apparatus as defined in claim 6, wherein said metal plate is shaped in accordance with the tool surface to be cooled.

8. Apparatus as defined in claim 7, wherein said intermediate layer is formed from heat-resistant non-metallic material taken from the group consisting of glass fibers and asbestos fibers.

9. Apparatus as defined in claim 7, wherein said intermediate layer consists of wire mesh.

10. Apparatus as defined in claim 7, and including a layer adapted to retain the cooling liquid and distributes the same especially by capillary action, said layer being applied to that surface of said metal plate which faces away from the tool surface to be cooled.

11. Apparatus as defined in claim 1, and including means for fastening said cover means to the tool.

12. Apparatus as defined in claim 1, and including means for releasably fastening said cover means to the tool.

13. Apparatus as defined in claim 1, and including means for fastening said cover means to the tool while permitting movement of said cover means along the tool surface to be cooled under the influence of different expansion and contraction of said cover means and said tool.

14. Apparatus as defined in claim 1, and including means for fastening said cover means to the tool and for pressing said cover means with a selected force against the tool surface to be cooled.

15. Apparatus as defined in claim 1, wherein said cover means comprises a plurality of superimposed layers and including fastening means for fastening said cover means to the tool and for pressing said plurality of layers with a selectible force against each other and against the tool surface to be cooled.

16. Apparatus as defined in claim 1, wherein said cooling liquid essentially consists of pretreated water and a wetting agent.

17. Apparatus as defined in claim 1, wherein said means for applying liquid to said cover means comprises a plurality of spaced spray nozzles.

18. Apparatus as defined in claim 17, and including at least one temperature sensing means engaging said cover means for sensing the temperature of the latter, and means for controlling spraying of the cooling liquid through said spray nozzles onto said cover means dependent on the temperature sensed by said temperature sensing means.

* * * * *

UNITED STATES PATENT AND TRADEMARK OFFICE
CERTIFICATE OF CORRECTION

PATENT NO. : 4,056,949
DATED : November 8, 1977
INVENTOR(S) : Karl Friedrich Hahn It is certified that error appears in the above-identified patent and that said Letters Patent are hereby corrected as shown below:

[63] The date should read:

April 16, 1974

*Signed and Sealed this*

*Eleventh* Day of *April 1978*

[SEAL]

Attest:

RUTH C. MASON
*Attesting Officer*

LUTRELLE F. PARKER
*Acting Commissioner of Patents and Trademarks*